June 8, 1971 K. WILFERT ET AL 3,583,022
WINDSHIELD WIPER ARRANGEMENT FOR MOTOR VEHICLES, ESPECIALLY
PASSENGER MOTOR VEHICLES
Filed Sept. 13, 1968 2 Sheets-Sheet 1
FIG.1
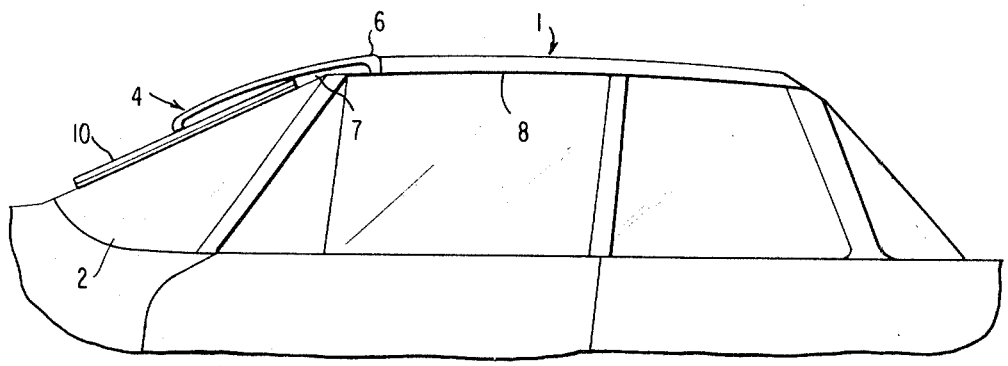
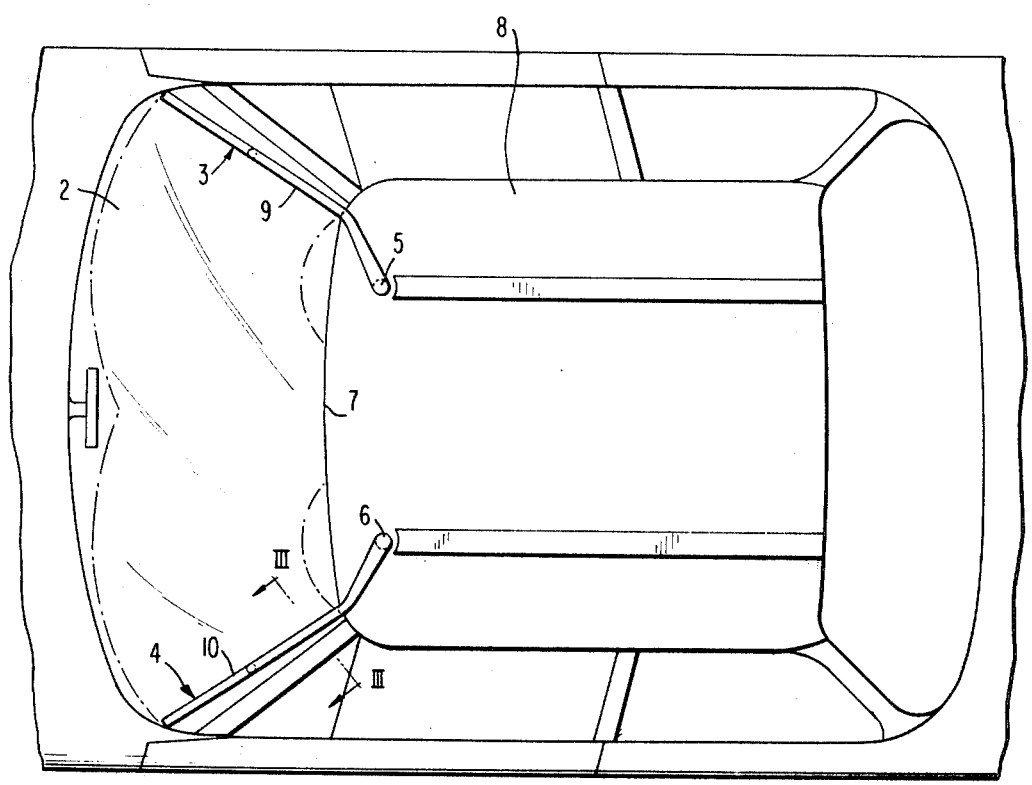
FIG. 2
INVENTORS
KARL WILFERT
RUDOLF ANDRES
BY Craig & Antonelli
ATTORNEYS

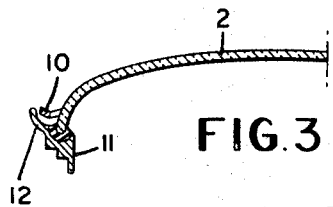
FIG.3
FIG.4
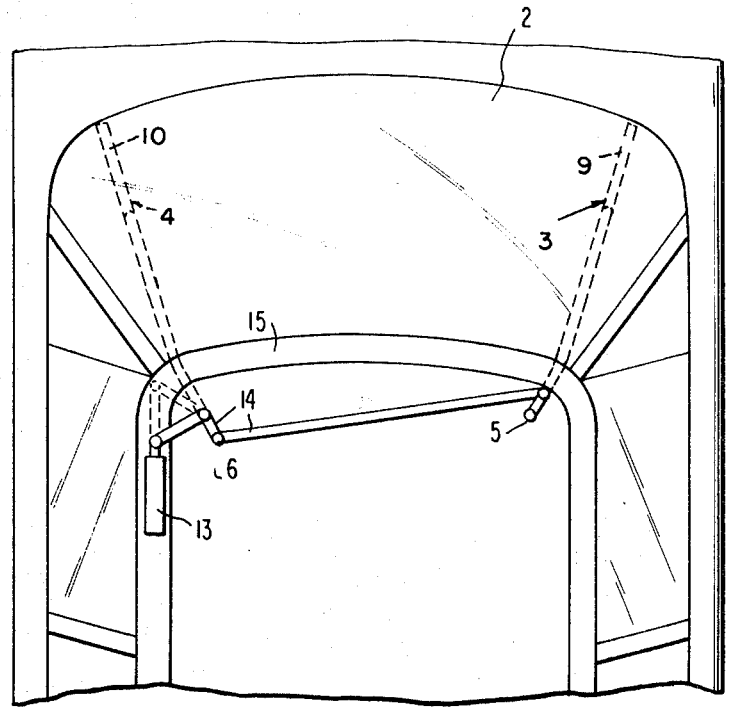
FIG.5
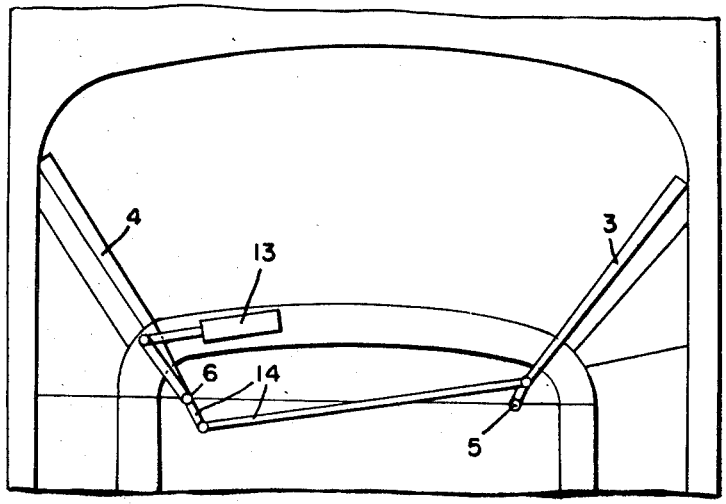
INVENTORS
KARL WILFERT
RUDOLF ANDRES
BY Craig & Antonelli
ATTORNEYS United States Patent Office 3,583,022
Patented June 8, 1971

3,583,022
WINDSHIELD WIPER ARRANGEMENT FOR MOTOR VEHICLES, ESPECIALLY PASSENGER MOTOR VEHICLES
Karl Wilfert, Gerlingen-Waldstadt, and Rudolf Andres, Sindelfingen, Germany, assignors to Daimler-Benz Aktiengesellschaft, Stuttgart-Unterturkheim, Germany
Filed Sept. 13, 1968, Ser. No. 759,582
Claims priority, application Germany, Sept. 16, 1967,
P 16 30 350.7
Int. Cl. A47l 1/00; B60s 1/02
U.S. Cl. 15—250                 4 Claims

ABSTRACT OF THE DISCLOSURE

A windshield wiper arrangement for motor vehicles, especially for passenger motor vehicles which includes an inclined windshield and two wipers, preferably operating in-phase opposition, whose axes of rotation are arranged on the vehicle roof at a considerable distance to the rear of the upper edge of the windshield.

---

The present invention relates to a windshield wiper arrangement for motor vehicles, especially for passenger motor vehicles, with an inclined windshiled and with two wipers operating preferably in-pase opposition.

With modern types of motor vehicles, the windshield panes are constructed large and receive an even more pronounced inclination. The visibility conditions for the driver are to be improved thereby. However, the known windshield wiper arrangements, in which two windshield wipers operating either in-phase or in-phase opposition are provided in front of the bottom edge of the windshield pane, are for the most part not able to keep free, during bad weather, a large field of vision corresponding to the large windshields.

The present invention aims at creating a wiper arrangement which wipes the entire windshield pane to the greatest possible extent. The present invention essentially consists in that the axes or centers of rotation of the wipers are arranged on the vehicle roof at a considerable distance to the upper edge of the windshield. By reason of the larger radii, the circular arc described by the wiper blades becomes larger whereby longer wiper blades can be used. A considerably larger area which can be kept free by the windshield wipers can be achieved thereby on the windshield pane while avoiding dead zones or blind angles.

In order not to impair the visibility conditions of the driver with non-actuated or inoperative wipers, the wiper blades may abut in the rest position against the lateral edges of the windshield pane. A cover strip or bar for the wiper blades may be provided thereby at the lateral edges of the windshield pane. This cover strip additionally entails the advantage that it serves simultaneously as water guard or deflector for the side windows and considerably reduces the soiling thereof.

Since the accommodation of the usual wiper drive is not possible without impairing the head freedom within the passenger space, a hydraulic working cylinder arranged advantageously within the roof frame may be provided which is disposed transversely or parallel to the wiper linkage. The arrangement of the hydraulic working cylinder within the roof frame also enables a favorable arrangement for removing and carrying off possibly occurring leakage oil.

Accordingly, it is an object of the present invention to provide a windshield wiper arrangement for motor vehicles which eliminates by simple means the aforementioned shortcomings and drawbacks encountered in the prior art.

Another object of the present invention resides in a windshield wiper arrangement for motor vehicles, especially passenger motor vehicles which is capable of clearing large areas corresponding to the large windshields as used in present-day motor vehicles.

A further object of the present invention resides in a windshield wiper arrangement of the type described above which permits the use of longer windshield wiper blades without impairing the visibility of the driver when the windshield wipers are not engaged or turned on.

Another object of the present invention resides in a windshield wiper arrangement that permits the accommodation of the wiper drive without impairing the head freedom of the passengers while at the same time utilizing existing parts, such as the tubular or box-type frame members of the roof frame for removing possible leakage oil.

Still another object of the present invention resides in a windshield wiper arrangement of the type described above in which the long wiper blades are guarded in the normal rest position by elements serving simultaneously as water-deflecting devices to minimize the soiling of the side windows of the vehicle.

These and further objects, features, and advantages of the present invention will become more obvious from the following description when taken in connection with the accompanying drawing which shows, for purposes of illustration only, one embodiment in accordance with the present invention, and wherein:

FIG. 1 is a side view of a motor vehicle with a windshield wiper arrangement in accordance with the present invention;

FIG. 2 is a plan view on the motor vehicle of FIG. 1;

FIG. 3 is a partial cross-sectional view taken along line III–III of FIG. 2; and FIG. 4 is a construction and arrangement of the windshield wiper drive in accordance with the present invention.

FIG. 5 is an arrangement in which the windshield wiper drive is disposed parallel to the wiper linkage.

Referring now to the drawing, wherein like reference numerals are used throughout the various views to designate like parts, and more particularly to FIGS. 1 and 2, the motor vehicle illustrated in the figures is generally designated therein by reference numeral 1 and includes a large, inclined and curved windshield 2 which enables good visibility conditions for the driver. In order to maintain these visibility conditions also during bad weather, correspondingly large, wiper surfaces have to be realized on the windshield 2.

In the rest position, the wiper blades 9 and 10 are pivoted into a vertical position at the lateral edges of the windshield 2 so that also in the rest position, they do not reduce or impair the field of vision of the driver. A cover strip or bar 12, open in the forward direction, is thereby provided for the windshield wiper blades 9 and 10 at the lateral rim 11 of the windshield 2 as can be seen from FIG. 3 which simultaneously acts as water-deflection means for the side windows (not shown).

In order not to lose any head freedom, which would necessarily occur with the use of conventional wiper drives in case of such type of an arrangement, a hydraulic drive is provided according to FIG. 4. This hydraulic drive consists of a hydraulic working cylinder 13 that acts on the wiper linkage 14. The hydraulic working cylinder 13 can be arranged advantageously, as illustrated in the embodiment, within the roof frame 15 which simultaneously offers a favorable possibility for carrying off and removing any possibly occurring leakage oil.

While we have shown and described only one embodiment in accordance with the present invention, it is understood that the same is not limited thereto but is susceptible of numerous changes and modifications as known to a person skilled in the art, and we therefore do not wish to It is claimed:

1. A windshield wiper arrangement for motor vehicles, eespecially for passenger motor vehicles, with an inclined windshield, side windows, and two windshield wipers, the centers of rotation of the wipers being arranged at a considerable distance to the rear of the upper edge of the windshield on the vehicle roof, the wiping blades abutting against the lateral edges of the windshield in the rest position, said lateral edges being substantially coplanar with said side windows, cover means for the wiper blades provided at the lateral edges of the windshield, said cover means being shaped so as to cover the blades and to form a wind and water guard for the side windows thereby reducing the soiling thereof, and roof frame means being provided at said vehicle, hydraulic drive means arranged in the roof frame means and operatively connected with the wipers by way of a wiper linkage means, wherein said hydraulic drive means includes a hydraulic working cylinder.

2. A windshield wiper arrangement according to claim 1, wherein said wipers operate in-phase opposition.

3. A windshield wiper arrangement according to claim 1, wherein said hydraulic working cylinder is arranged transversely to the wiper linkage means.

4. A windshield wiper arrangement according to claim 1, wherein said hydraulic working cylinder is arranged parallel to the windshield wiper linkage means.

References Cited

UNITED STATES PATENTS

| | | | |
|---|---|---|---|
| 2,493,552 | 1/1950 | Sacchini | 15—250.23X |
| 2,947,020 | 8/1960 | Wilfert et al. | 15—250.16 |
| 3,082,462 | 3/1963 | Barenyi | 15—250.3 |

FOREIGN PATENTS

| | | | |
|---|---|---|---|
| 721,465 | 1/1955 | Great Britain | 15—250.16 |

PETER FELDMAN, Primary Examiner

U.S. Cl. X.R.

15—250.3, 250.16